(12) United States Patent
Koh

(10) Patent No.: US 11,338,760 B2
(45) Date of Patent: May 24, 2022

(54) CUSHION OF AIRBAG APPARATUS

(71) Applicant: HYUNDAI MOBIS CO., LTD., Seoul (KR)

(72) Inventor: Min Seok Koh, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/081,215

(22) Filed: Oct. 27, 2020

(65) Prior Publication Data

US 2021/0122322 A1 Apr. 29, 2021

(30) Foreign Application Priority Data

Oct. 29, 2019 (KR) .......................... 10-2019-0135013

(51) Int. Cl.
*B60R 21/233* (2006.01)
*B60R 21/235* (2006.01)

(52) U.S. Cl.
CPC .. *B60R 21/233* (2013.01); *B60R 2021/23316* (2013.01); *B60R 2021/23576* (2013.01)

(58) Field of Classification Search
CPC ........... B60R 2021/23308; B60R 2021/23316; B60R 2021/23576; B60R 21/203; B60R 21/205; B60R 21/231; B60R 21/233
See application file for complete search history.

(56) References Cited

U.S. PATENT DOCUMENTS

| 5,316,337 | A | * | 5/1994 | Yamaji | D05B 39/00 280/728.1 |
| 6,129,382 | A | * | 10/2000 | Tonooka | B60R 21/231 280/743.1 |
| 6,382,664 | B1 | * | 5/2002 | Hirano | B60R 21/233 280/730.2 |
| 6,439,606 | B2 | * | 8/2002 | Okada | B60R 21/233 280/740 |
| 6,672,618 | B2 | * | 1/2004 | Keshavaraj | B60R 21/231 280/743.1 |
| 6,832,779 | B2 | * | 12/2004 | Tajima | B60R 21/231 280/740 |
| 7,150,470 | B2 | * | 12/2006 | Okada | B60R 21/205 280/743.1 |
| 7,487,994 | B2 | * | 2/2009 | Okada | B60R 21/205 280/728.2 |
| 7,866,693 | B2 | * | 1/2011 | Onohara | B60R 21/231 280/743.1 |
| 7,914,038 | B2 | * | 3/2011 | Koyama | B60R 21/205 280/730.1 |
| 7,922,198 | B2 | * | 4/2011 | Urushibata | B60R 21/235 280/743.1 |

* cited by examiner

*Primary Examiner* — Laura Freedman
(74) *Attorney, Agent, or Firm* — DLA Piper LLP (US)

(57) ABSTRACT

A cushion of an airbag apparatus may include: a rear panel having a gas inlet formed at the rear thereof, and a first connecting end formed along the edge thereof and deployed forward when gas is introduced into a primary filling room open to the front; and a front panel having a second connecting end formed along the edge thereof at the front of the rear panel and coupled to the first connecting end, and a passenger support region which is formed at the front surface thereof and deployed forward when gas is introduced into a secondary filling room open to the rear.

11 Claims, 6 Drawing Sheets

CUSHION OF AIRBAG APPARATUS

CROSS-REFERENCE TO RELATED APPLICATION

This application claims priority from and the benefit of Korean Patent Application No. 10-2019-0135013, filed on Oct. 29, 2019, which is hereby incorporated by reference for all purposes as if set forth herein.

BACKGROUND

Field

Exemplary embodiments of the present disclosure relate to a cushion of an airbag apparatus, and more particularly, to a cushion of an airbag cushion, which can simplify a structure, and increase a protruding region when deployed, thereby not only quickly constraining a passenger, but also widening a passenger supporting region.

Discussion of the Background

In general, an airbag apparatus of a vehicle refers to a device that can momentarily inflate an airbag in case of a vehicle collision, and thus reduce an injury caused by an impact.

Such an airbag apparatus is mounted in a steering wheel of a driver seat or a passenger seat, and deploys a cushion using gas supplied from an inflator when an impact is applied to a vehicle, thereby reducing an injury to a passenger.

The cushion of the conventional airbag apparatus includes one main panel, a pair of side panels coupled to both sides of the main panel, respectively, and filling rooms formed in the main panel and the side panels. Each of the filling rooms includes a front tether for maintaining the shape of the cushion in a front-to-rear direction when the cushion is deployed, and a side tether for maintaining the shape of the cushion in a side-to-side direction when the cushion is deployed.

However, since the cushion of the conventional airbag apparatus has a complex structure and a large volume, there are difficulties in securing a storage space. Furthermore, since even a corner portion where the main panel and the side panels are coupled needs to be filled with gas, the inflation speed of the cushion is slowed, which makes it difficult to protect a passenger.

SUMMARY

Various embodiments are directed to a cushion of an airbag apparatus, which includes front and rear panels coupled to each other, and thus can reduce the manufacturing cost and weight thereof as well as the volume thereof because the number of parts is reduced, thereby making it easy to store the cushion.

Also, various embodiments are directed to a cushion of an airbag apparatus, which has protruding regions formed at the tops and bottoms of rear and front panels, and thus can not only quickly constrain a passenger by increasing a protruding region when the cushion is deployed at the initial stage, but also improve safety by increasing a passenger support region when the cushion is completely deployed.

In an embodiment, a cushion of an airbag apparatus may include: a rear panel having a gas inlet formed at a rear thereof, and a first connecting end formed along an edge thereof and deployed forward when gas is introduced into a primary filling room open to a front; and a front panel having a second connecting end formed along an edge thereof at a front of the rear panel and coupled to the first connecting end, and a passenger support region which is formed at a front thereof and deployed forward when gas is introduced into a secondary filling room open to a rear.

Both ends of the rear panel in a side-to-side direction may be divided into upper and lower parts by a pair of sewing lines based on a connection region, and the sewing lines may be sewed to each other in a widthwise direction thereof, and vertically connect both ends of the rear panel in the side-to-side direction.

The pair of sewing lines may be formed to correspond to left and right sides of the connection region.

The pair of sewing lines may be connected to both ends of the connection region in the side-to-side direction, respectively, while a gap between the pair of sewing lines gradually decreases toward the rear.

The gas inlet may be formed at a center position of the connection region.

The first connecting end may include a rear-side upper connection section formed at a top of the sewing line and a rear-side lower connection section formed at a bottom of the sewing line, and the second connecting end may include a front-side upper connection section sewed to the rear-side upper connection section and a front-side lower connection section sewed to the front-side upper connection section.

The rear-side upper connection section and the front-side upper connection section may have the same length.

The rear-side lower connection section and the front-side lower connection section may have the same length.

The rear-side upper connection section may protrude upward while having a curvature in the side-to-side direction, and the front-side upper connection section may include a first front-side coupling part having a length in the side-to-side direction such that a center thereof coincides with a center of the rear-side upper connection section, and a pair of second front-side coupling parts bent and extended downward from both ends of the first front-side coupling part in a longitudinal direction.

The rear-side lower connection section may include a pair of first rear-side coupling parts formed on left and right sides thereof, respectively, and having a length in the side-to-side direction, and a second rear-side coupling part connected to corresponding ends of the first rear-side coupling parts and protruding while having a curvature downward, and the front-side lower connection section may include a pair of third front-side coupling parts formed on left and right sides thereof, respectively, and protruding while having a curvature in directions facing each other, and a fourth front-side coupling part having a length in the side-to-side direction and both longitudinal ends connected to lower ends of the third front-side coupling parts, respectively.

The pair of third front-side coupling parts may have a side-to-side width larger than the pair of second front-side coupling parts.

In accordance with the embodiments of the present disclosure, the rear panel and the front panel may be coupled to each other, which makes it possible to simplify the structure and to reduce the number of parts. Therefore, since the manufacturing cost, weight and volume of the cushion can be reduced, the cushion may be easily stored.

Furthermore, the protruding regions may be formed at the tops and bottoms of the rear panel and the front panel, thereby widening the region which protrudes when the cushion is deployed at the initial stage. Thus, the cushion can quickly constrain a passenger, and widen the passenger support region when completely inflated, which makes it possible to improve the safety.

DETAILED DESCRIPTION OF THE ILLUSTRATED EMBODIMENTS

Hereinafter, a cushion of an airbag apparatus will be described below with reference to the accompanying drawings through various exemplary embodiments. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
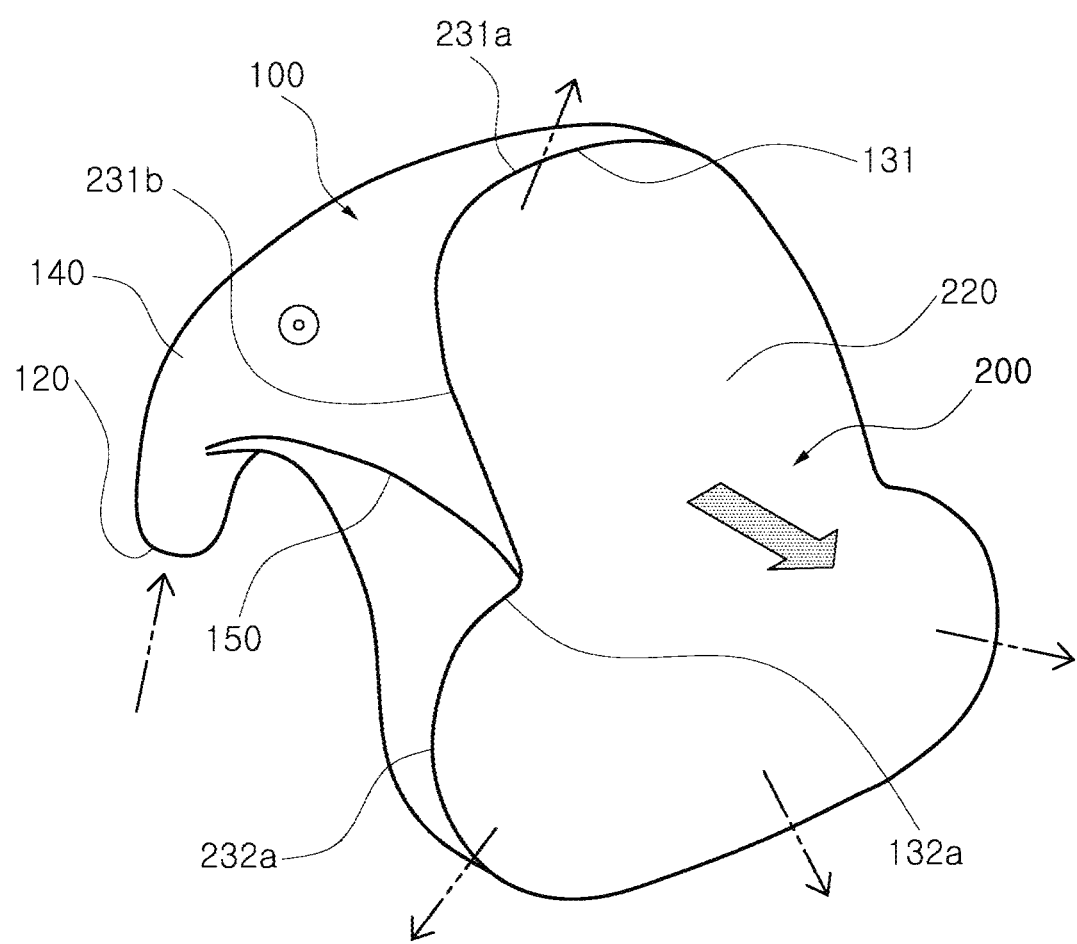
FIG. 1 is a perspective view illustrating a cushion of an airbag apparatus in accordance with an embodiment of the present disclosure.
Figure 2:
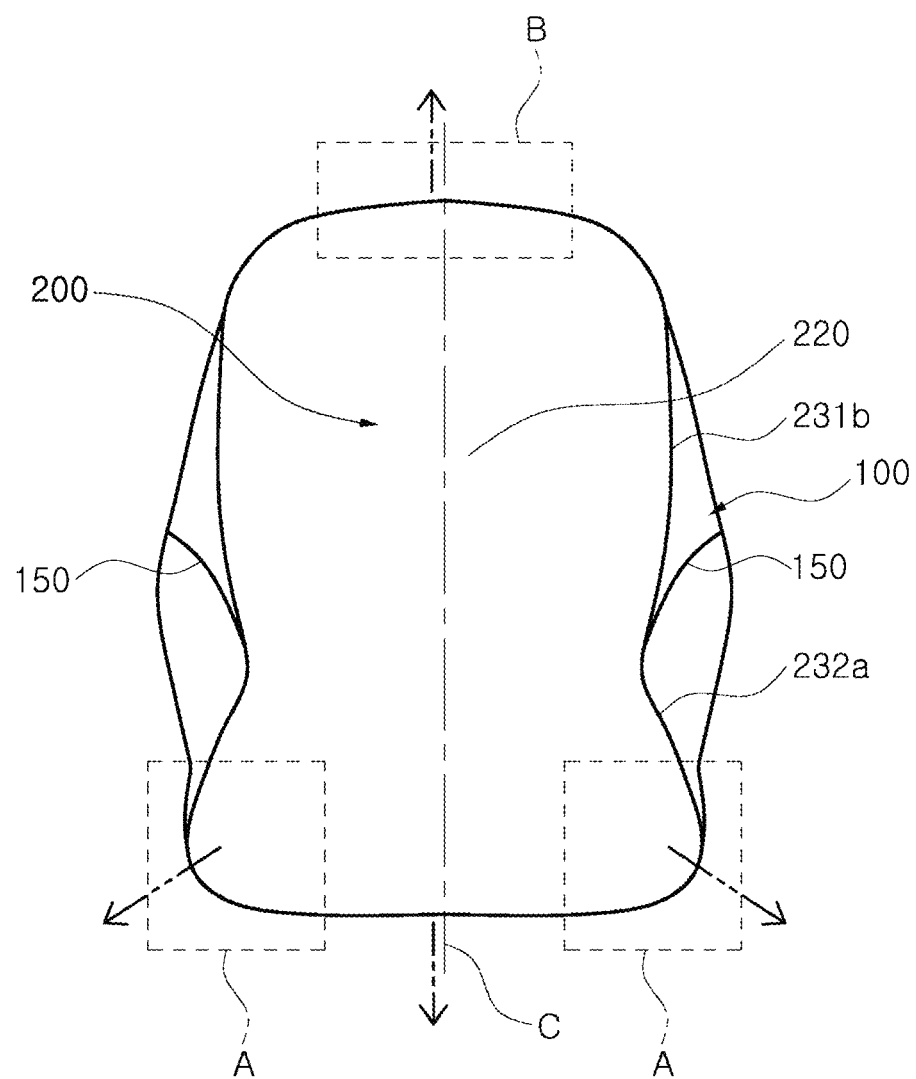
FIG. 2 is a front view illustrating the cushion of the airbag apparatus in accordance with the embodiment of the present disclosure.
Figure 3:
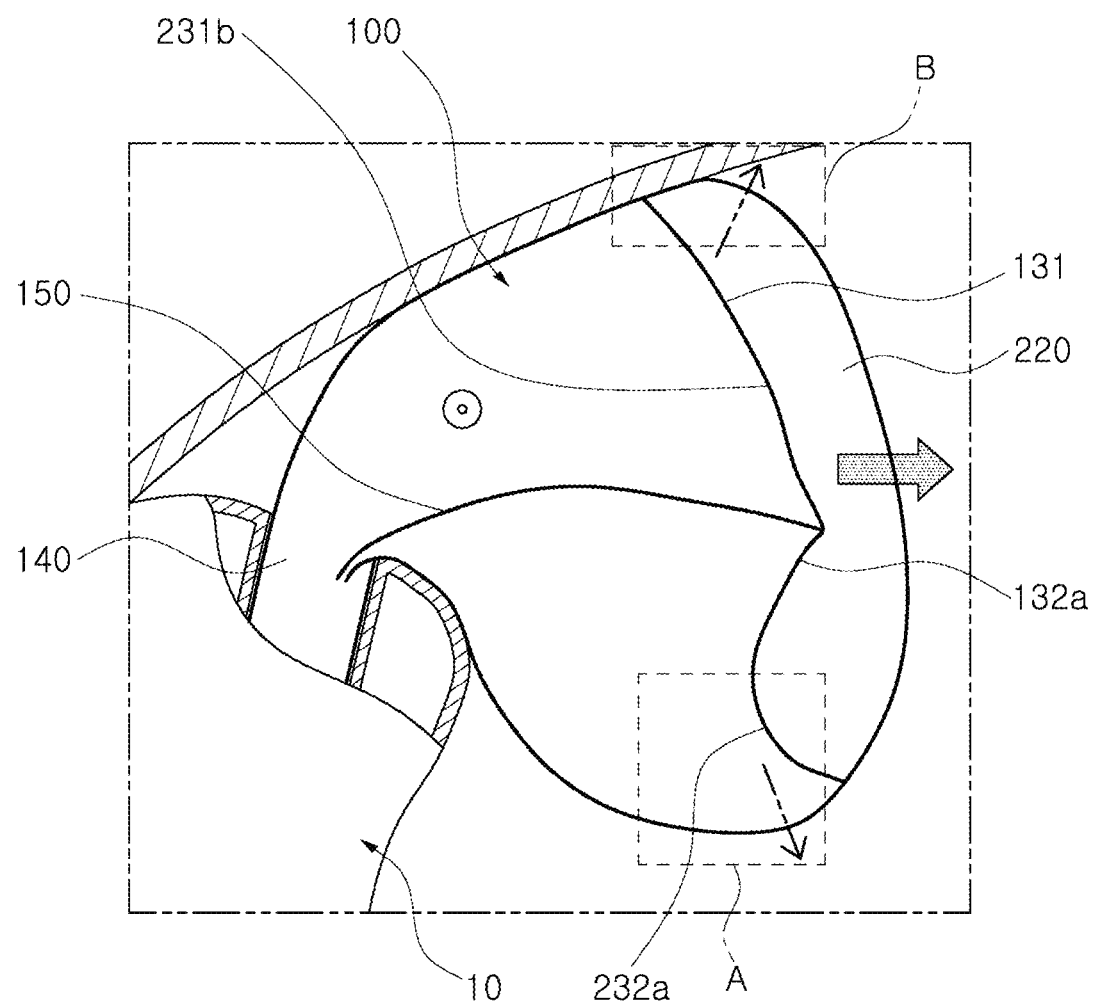
FIG. 3 is a side view illustrating the cushion of the airbag apparatus in accordance with the embodiment of the present disclosure.

FIG. 1 is a perspective view illustrating a cushion of an airbag apparatus in accordance with an embodiment of the present disclosure, FIG. 2 is a front view illustrating the cushion of the airbag apparatus in accordance with the embodiment of the present disclosure, and FIG. 3 is a side view illustrating the cushion of the airbag apparatus in accordance with the embodiment of the present disclosure.

Figure 4:
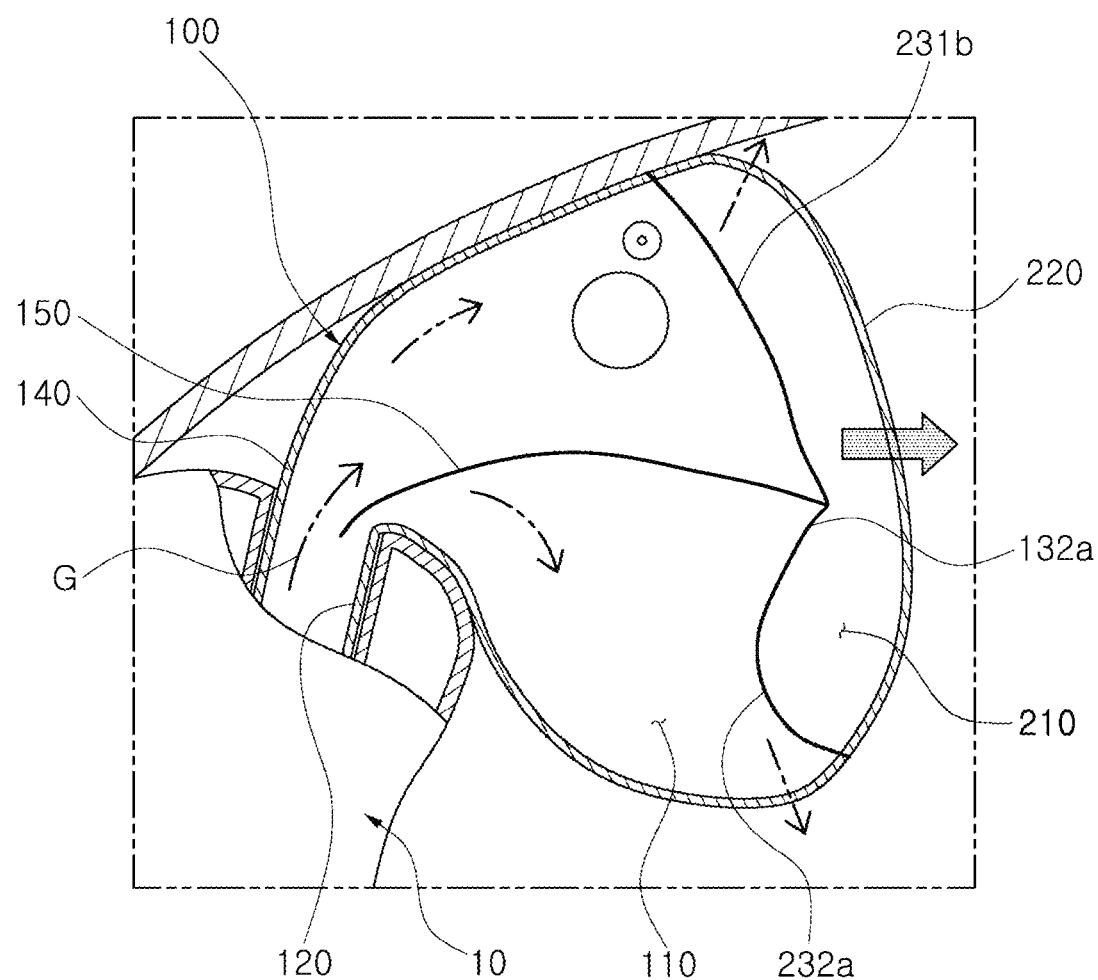
FIG. 4 is a side cross-sectional view illustrating the cushion of the airbag apparatus in accordance with the embodiment of the present disclosure.
Figure 5:
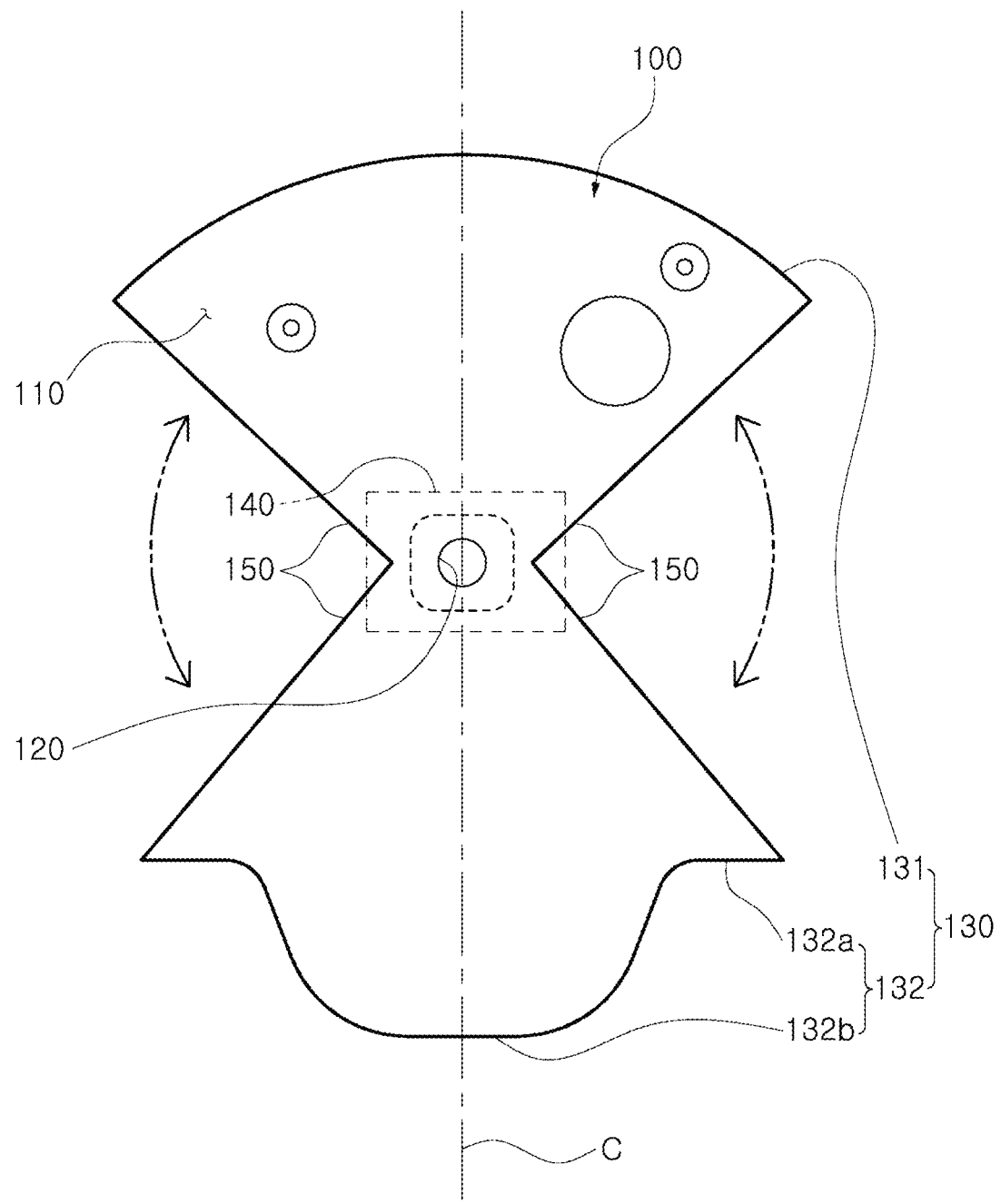
FIG. 5 is a front view illustrating that a rear panel of the cushion of the airbag apparatus in accordance with the embodiment of the present disclosure is unfolded.
Figure 6:
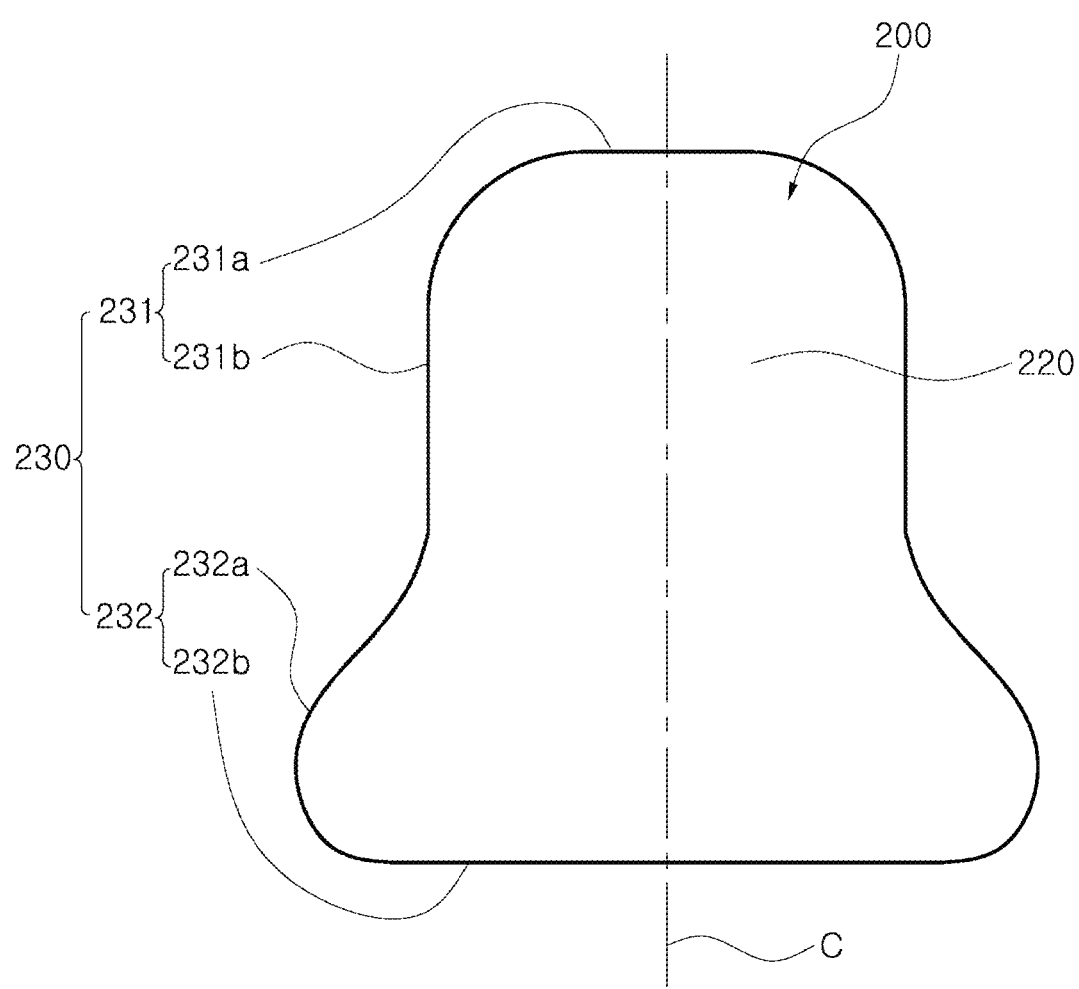
FIG. 6 is a perspective view illustrating that a front panel of the cushion of the airbag apparatus in accordance with the embodiment of the present disclosure is unfolded.

FIG. 4 is a side cross-sectional view illustrating the cushion of the airbag apparatus in accordance with the embodiment of the present disclosure, FIG. 5 is a front view illustrating that a rear panel of the cushion of the airbag apparatus in accordance with the embodiment of the present disclosure is unfolded, and FIG. 6 is a perspective view illustrating that a front panel of the cushion of the airbag apparatus in accordance with the embodiment of the present disclosure is unfolded.

As illustrated in FIGS. 1 to 6, the cushion of the airbag apparatus in accordance with the embodiment of the present disclosure includes a rear panel 100 positioned at the rear thereof and a front panel 200 positioned at the front thereof.

The rear panel 100 is connected to a gas generator (also referred to as an inflator) installed in a driver seat or passenger seat of a vehicle 10. When an impact equal to or more than a preset range is applied to the vehicle 10, gas is supplied from the gas generator.

The rear panel 100 has a gas inlet 120 formed at the rear thereof. The gas inlet 120 is connected to a gas supply part, and formed through the rear panel 100 in a front-to-rear direction.

Furthermore, the rear panel 100 may have a connection part formed at the rear thereof. The connection part may serve to extend the gas inlet 120, and have a smaller diameter than the rear panel 100.

Also, the rear panel 100 includes a primary filling room 110 having a predetermined area. The primary filling room 110 is open to the front so as to be filled with gas G injected from the gas supply part.

Furthermore, the rear panel 100 has a first connecting end 130 formed at the edge thereof such that the first connecting end 130 is coupled to a second connecting end 230 of the front panel 200, which will be described below.

The first connecting end 130 may be deployed forward when gas is injected into the primary filling room 110 through the gas inlet 120, and have various shapes.

Furthermore, both ends of the rear panel 100 in the side-to-side direction may be divided into upper and lower ends by a pair of sewing lines 150 having a length corresponding to the first connecting end 130, based on a connection region 140.

The gas inlet 120 may be formed in the connection region 140 which is not divided by the sewing lines 150. However, the position of the gas inlet 120 is not limited thereto.

The pair of sewing lines 150 may have a length in the front-to-rear direction, and the upper and lower ends divided in the widthwise direction of the sewing lines 150 may be sewed and coupled to each other.

At this time, the pair of sewing lines 150 may be connected to both ends of the connection region 140 in the side-to-side direction, respectively, while the gap between the pair of sewing lines 150 gradually decreases toward the rear.

The rear panel 100 may have a shape in which the top-to-bottom and side-to-side widths thereof gradually increase toward the front, when the cushion is deployed.

For example, the rear panel 100 may have a top-to-bottom width larger than a side-to-side width thereof, in order to constrain the upper body, face and lower body of a passenger.

The first connecting end 130 may be sewed to the second connecting end 230 which will be described below, and divided into a rear-side upper connection section 131 and a rear-side lower connection section 132.

As illustrated in FIG. 5, the rear-side upper connection section 131 may be formed at the top of the sewing line 150 in the widthwise direction, and protrude upward while having a curvature in the side-to-side direction.

The rear-side upper connection section 131 may be coupled to a front-side upper connection section 231 which will be described below, and the center position C of the rear-side upper connection section 131 may be further extended upward than both ends thereof in the side-to-side direction when the cushion is deployed forward.

Since the rear-side upper connection section 131 has a shape in which the center position C thereof in the longitudinal direction protrudes upward, an upper protruding region B may be further formed when the cushion is deployed.

Therefore, the rear-side upper connection section 131 may widen a region which protrudes upward when the cushion is deployed at the initial stage, and thus quickly constrain the upper body and face of the passenger.

The protruding length and shape of the rear-side upper connection section 131 may be changed to selectively adjust the protruding length and shape of the upper protruding region B.

More specifically, the rear-side lower connection section 132 may be formed at the bottom of the sewing line 150 in the widthwise direction, and divided into a pair of first rear-side coupling parts 132a and a second rear-side coupling part 132b.

As illustrated in FIG. 5, the first rear-side coupling parts 132a may be formed to correspond to both sides of the rear panel 100, respectively, and have a length in the side-to-side direction.

The second rear-side coupling part 132b may be connected to corresponding ends of the first rear-side coupling parts 132a, and protrude while having a curvature downward.

At this time, one end of the second rear-side coupling part 132b and both ends of the first rear-side coupling parts 132a in the longitudinal direction may be connected in a curved shape.

The front panel 200 is inflated forward to constrain the body of a passenger when the vehicle 10 collides, and coupled to the front of the rear panel 100.

The front panel 200 includes a secondary filling room 210 having a predetermined area. The secondary filling room 210 is open to the rear so as to be filled with the gas G transferred from the gas supply part.

The second connecting end 230 formed along the edge of the front panel 200 is sewed to the first connecting end 130 of the rear panel 100.

The front panel 200 has a passenger support region 220 formed on the front surface thereof. When gas is introduced into the secondary filling room 210 through the primary filling room 110 of the rear panel 100, the passenger support region 220 is deployed while protruding forward.

The passenger support region 220 may correspond to a region which supports the upper body, face and lower body of a passenger, and have a predetermined area in the top-to-bottom and side-to-side directions.

As illustrated in FIG. 6, the second connecting end 230 may be divided into the front-side upper connection section 231 and a front-side lower connection section 232.

The front-side upper connection section 231, which is sewed to the rear-side upper connection section 131, may be divided into a first front-side coupling part 231a and a pair of second front-side coupling parts 231b.

The first front-side coupling part 231a is coupled to the rear-side upper connection section 131 such that the centers thereof coincide with each other.

The first front-side coupling part 231a has a length in the side-to-side direction, and both ends of the first front-side coupling part 231a in the longitudinal direction are bent downward and connected to upper ends of the second front-side coupling parts 231b which will be described below.

The pair of second front-side coupling parts 231b are bent and extended downward from both ends of the first front-side coupling part 231a in the longitudinal direction.

The front-side upper connection section 231 may have the same length as the above-described rear-side upper connection section 131, and the front-side lower connection section 232 may have the same length as the rear-side lower connection section 132.

The front-side lower connection section 232, which is sewed to the front-side upper connection section, may be divided into a pair of third front-side coupling parts 232a and a fourth front-side coupling part 232b.

The pair of third front-side coupling parts 232a may be formed on the left and right sides, respectively, and protrude while having a curvature in directions facing each other.

The pair of third front-side coupling parts 232a may have a side-to-side width larger than the pair of the second front-side coupling parts 231b.

Since the third front-side coupling parts 232a protrude longer in the side-to-side direction of the front panel 200, the third front-side coupling parts 232a may protrude longer to the front when the cushion is deployed.

That is, since the third front-side coupling parts 232a have a shape to protrude from both sides of the front panel 200, a lower protruding region A may be further formed when the cushion is deployed.

Therefore, the third front-side coupling parts 232a may widen a region which protrudes forward when the cushion is deployed at the initial stage. Thus, the third front-side coupling parts 232a may quickly constrain a passenger, and support the passenger through a larger area.

The protruding lengths and shapes of the third front-side coupling parts 232a may be changed to selectively adjust the protruding length and shape of the lower protruding region A.

The fourth front-side coupling part 232b has a length in the side-to-side direction, and both ends of the fourth front-side coupling part 232b in the longitudinal direction are connected to lower ends of the third front-side coupling parts 232a, respectively.

As a result, the rear panel 100 and the front panel 200 may be coupled to each other, which makes it possible to simplify the structure and to reduce the number of parts. Therefore, since the manufacturing cost, weight and volume of the cushion can be reduced, the cushion may be easily stored.

Furthermore, the protruding regions A and B may be formed at the tops and bottoms of the rear panel 100 and the front panel 200, thereby widening the region which protrudes when the cushion is deployed at the initial stage. Thus, the cushion can quickly constrain a passenger, and widen the passenger support region 220 when completely inflated, which makes it possible to improve the safety.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A cushion of an airbag apparatus, comprising:
    a rear panel having a gas inlet formed at a rear thereof, and a first connecting end formed along an edge thereof and deployed forward when gas is introduced into a primary filling room open to a front;
    a front panel having a second connecting end formed along an edge thereof at a front of the rear panel and coupled to the first connecting end, a passenger support region which is formed at a front thereof and deployed forward when gas is introduced into a secondary filling room open to a rear;
    an upper protruding region that protrudes upward while having a curvature in a side-to-side direction during the forward deployment of the passenger support region; and
    a pair of lower protruding regions that protrude with downward curvatures during the forward deployment of the passenger support region.

2. The cushion of claim 1, wherein both ends of the rear panel in the side-to-side direction are divided into upper and lower parts by a pair of sewing lines based on a connection region, wherein the sewing lines are sewed to each other in a widthwise direction thereof, and vertically connect both ends of the rear panel in the side-to-side direction.

3. The cushion of claim 2, wherein the pair of sewing lines is formed to correspond to left and right sides of the connection region.

4. The cushion of claim 2, wherein the pair of sewing lines is connected to both ends of the connection region in the side-to-side direction, respectively, while a gap between the pair of sewing lines gradually decreases toward the rear.

5. The cushion of claim 2, wherein the gas inlet is formed at a center position of the connection region.

6. The cushion of claim 2, wherein the first connecting end comprises a rear-side upper connection section formed at a top of the sewing lines and a rear-side lower connection section formed at a bottom of the sewing lines, and
the second connecting end comprises a front-side upper connection section sewed to the rear-side upper connection section and a front-side lower connection section sewed to the rear-side lower connection section.

7. The cushion of claim 6, wherein the rear-side upper connection section and the front-side upper connection section have the same length.

8. The cushion of claim 6, wherein the rear-side lower connection section and the front-side lower connection section have the same length.

9. The cushion of claim 6, wherein the upper protruding region is at least partially on the rear-side upper connection section, and
the front-side upper connection section comprises a first front-side coupling part having a length in the side-to-side direction such that a center thereof coincides with a center of the rear-side upper connection section, and a pair of second front-side coupling parts bent and extended downward from both ends of the first front-side coupling part in a longitudinal direction.

10. The cushion of claim 9, wherein the rear-side lower connection section comprises a pair of first rear-side coupling parts formed on left and right sides thereof, respectively, and having a length in the side-to-side direction, and a second rear-side coupling part connected to corresponding ends of the first rear-side coupling parts forming at least a portion of the pair of lower protruding regions, and
the front-side lower connection section comprises a pair of third front-side coupling parts formed on left and right sides thereof, respectively, and protruding while having a curvature in directions facing each other, and a fourth front-side coupling part having a length in the side-to-side direction and both longitudinal ends connected to lower ends of the third front-side coupling parts, respectively.

11. The cushion of claim 10, wherein the pair of third front-side coupling parts have a side-to-side width larger than the pair of second front-side coupling parts.

* * * * *